Nov. 11, 1941.    D. D. ORMSBY    2,262,467
ENGINE ENCLOSURE
Filed July 26, 1940    4 Sheets-Sheet 1

INVENTOR.
DONALD D. ORMSBY.
BY Walter E. Schirmer
ATTORNEY.

Nov. 11, 1941.  D. D. ORMSBY  2,262,467
ENGINE ENCLOSURE
Filed July 26, 1940  4 Sheets-Sheet 3

INVENTOR.
DONALD D. ORMSBY.
BY Walter E. Schirmer
ATTORNEY.

Nov. 11, 1941.        D. D. ORMSBY        2,262,467
ENGINE ENCLOSURE
Filed July 26, 1940        4 Sheets-Sheet 4

INVENTOR.
DONALD D. ORMSBY.
BY Walter E. Schirmer
ATTORNEY.

Patented Nov. 11, 1941

2,262,467

UNITED STATES PATENT OFFICE 2,262,467

ENGINE ENCLOSURE

Donald D. Ormsby, Buchanan, Mich., assignor to Clark Equipment Company, Buchanan, Mich., a corporation of Michigan Application July 26, 1940, Serial No. 347,601

11 Claims. (Cl. 180—54)

This invention relates to engine enclosures, and more particularly is directed to an enclosure for the auxiliary engine of a booster engine system, such as described in my co-pending application, Serial No. 246,947, filed February 17, 1939.

I have found, in the development of such booster engine assemblies, that it is essential that the booster engine be enclosed for a number of reasons. In the first place, it is mounted in an exposed position between the rear of the cab and the fifth wheel connection to the tractor, and consequently should be enclosed against possibility of objects striking the same, and also should be protected from the weather and dust and dirt. In addition, since the heating of the booster engine in cold weather is produced by bypassing a portion of the liquid coolant from the main engine, it is desirable that the booster engine be enclosed in order to conserve the heat and maintain it at proper operating temperature to insure ready starting.

At the same time, the enclosure must be such as to give free circulation of air therethrough for summer operation, and also must be so designed and arranged as to provide proper amounts of air to the carburetor.

In assemblies to which the present invention relates, the booster engine is located rearwardly of the driver's cab and closely adjacent one of the side rails. As a result, it is placed in a position where vacuum from the passage of the cab through the air is created, and consequently it is of distinct importance that some means be provided for insuring a steady flow of air to the intake of the carburetor so as to prevent thinning out of the air charge, and consequent loss of power.

It is therefore a primary object of the present invention to provide an enclosure for a booster engine of this type which will protect it fully from dust, dirt, and other hazards, and yet will allow a steady flow of air to the carburetor while at the same time sufficiently enclosing the engine to maintain it at the proper operating temperature.

Another object of the invention is to provide a louver arrangement and detachable hood for the enclosure which will insure circulation of air throughout the engine, preventing any localized heating points, the detachable hood providing ready access to the engine accessories, such as the starter, ignition system, and the like.

Other objects and advantages of the present invention will be more apparent from the following detailed description which, taken in conjunction with the accompanying drawings, will disclose to those skilled in the art the particular construction and operation of a preferred form of the present invention.

Figure 1:
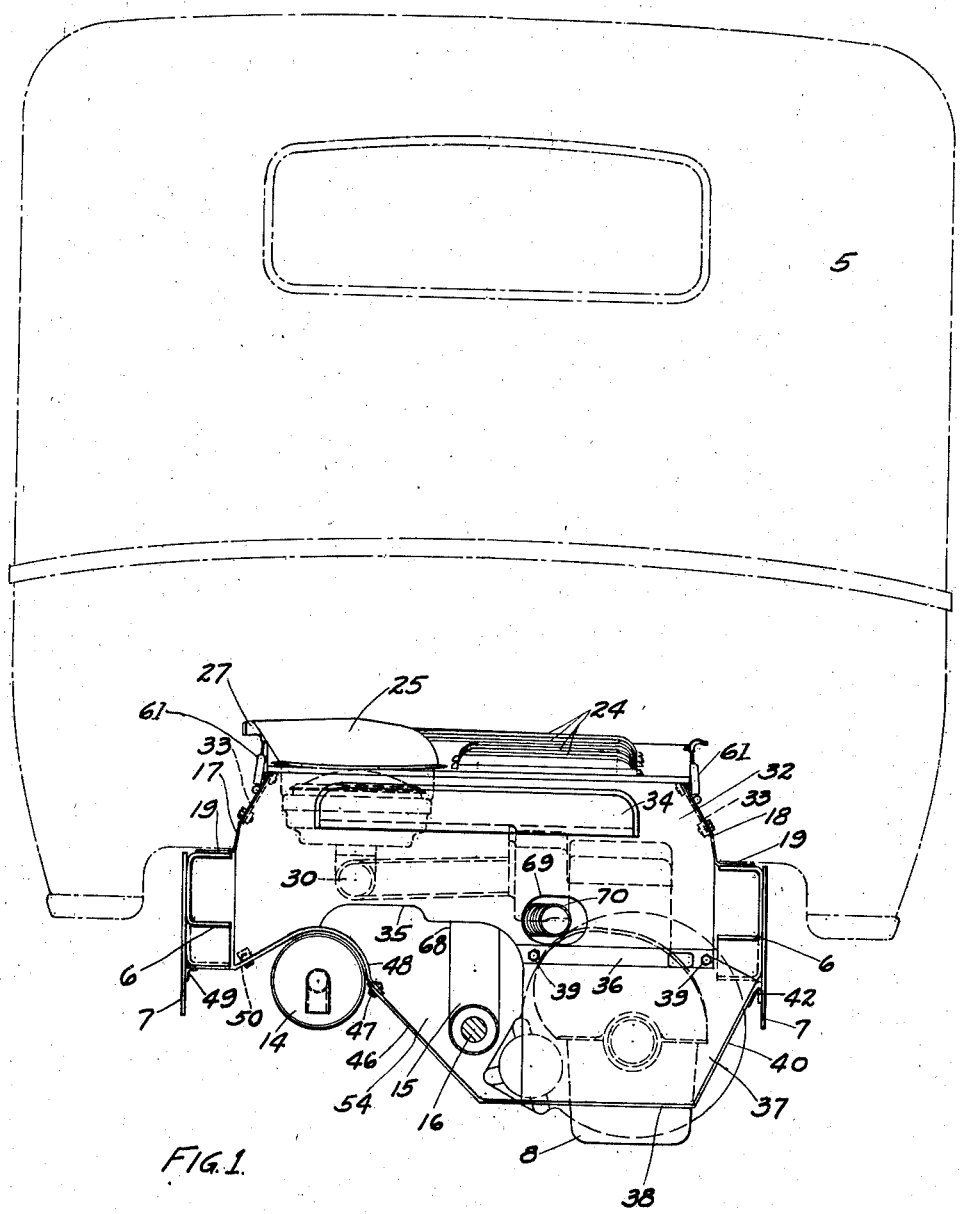
Figure 1 is a rear elevational view of a booster engine construction embodying the present invention.

Referring now in detail to the drawings, an engine cab is shown diagrammatically in Figure 1 at 5, and is suitably supported upon the rearwardly extending side rails or channels 6 formed as part of the vehicle chassis. These side rails may have secured to their outer surfaces fish plates 7, if desired, for the purpose of re-enforcement, although the invention is equally applicable to a construction where such plates are not available.

Figure 2:
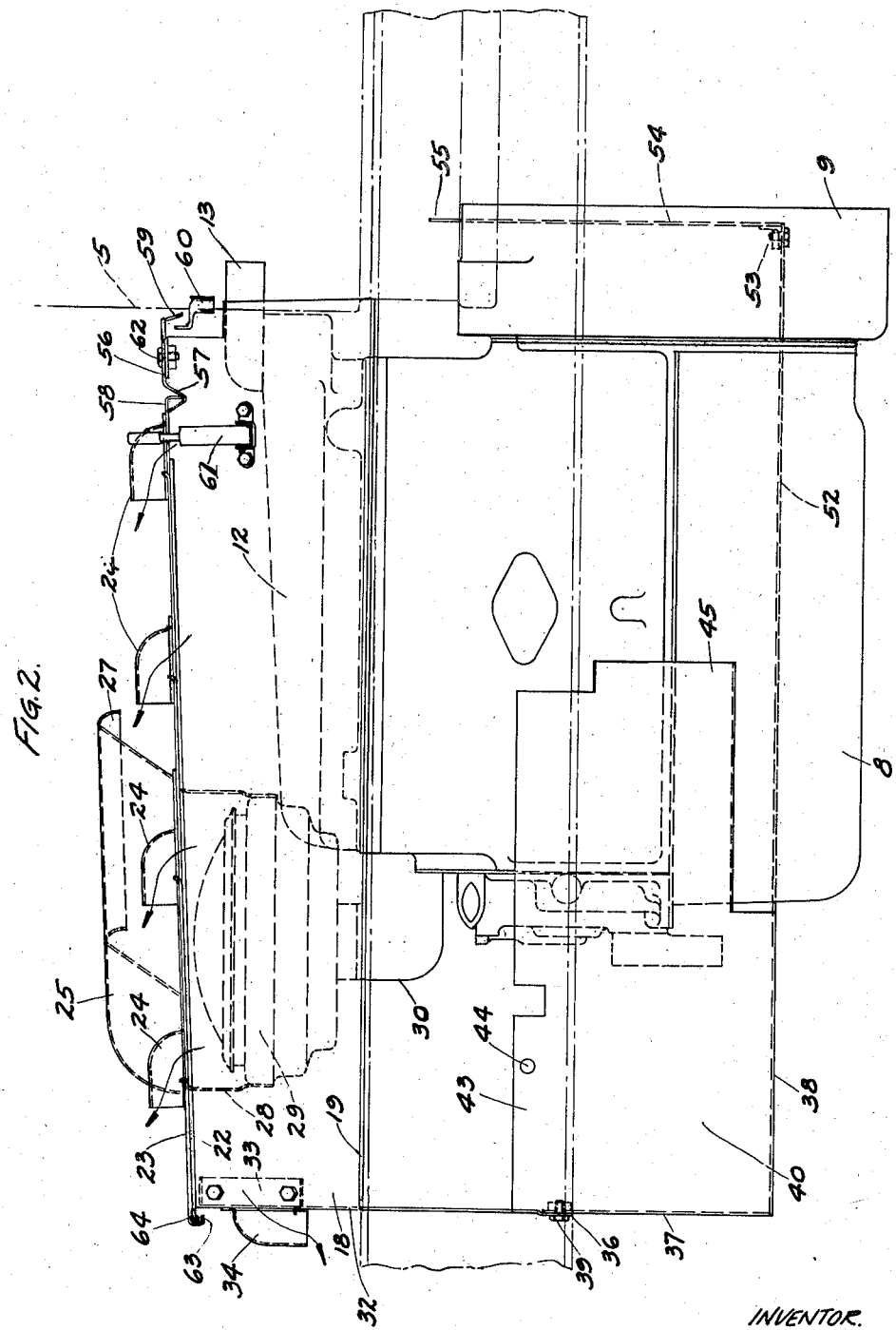
Figure 2 is a side elevational view of the construction shown in Figure 1.

The booster engine itself is indicated at 8, and includes at its forward end the bell housing 9, this arrangement of the booster engine being as described in my copending application, Serial No. 319,996, filed February 21, 1940, with the engine facing rearwardly with respect to the truck chassis and having a head 12 provided with the water connection 13 which extends into the rear wall of the cab indicated by the line 5 in Figure 2.

Figure 3:
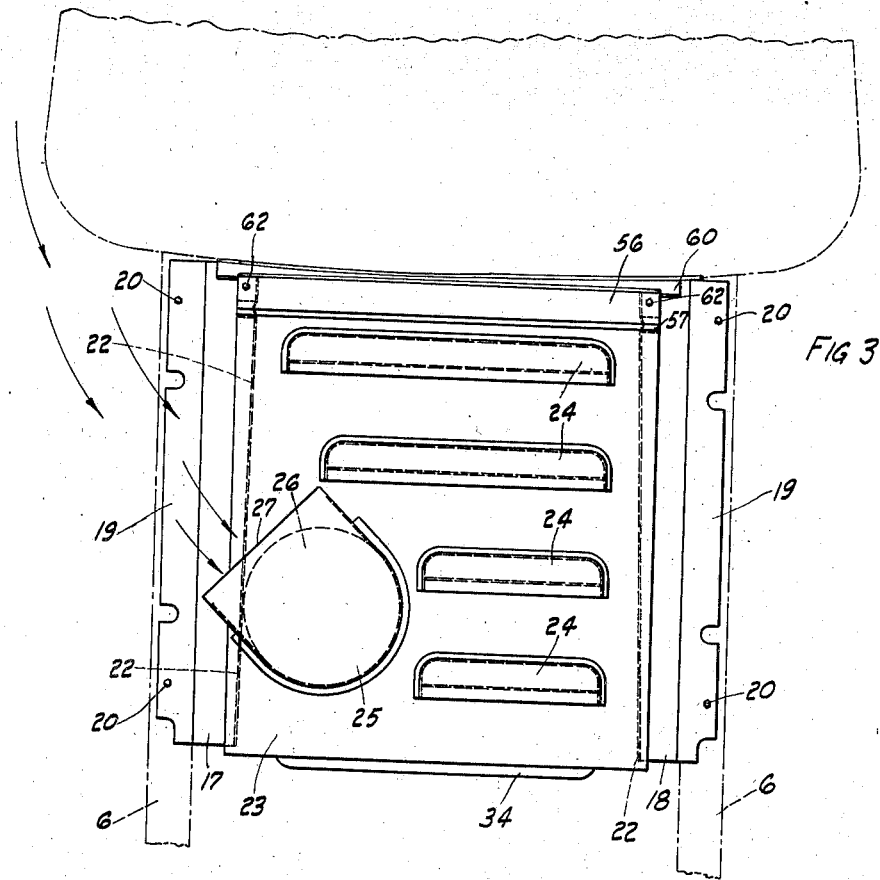
Figure 3 is a top plan view of the construction shown in Figures 1 and 2.

The entire enclosure extends between the two side rails overlying the muffler 14 of the main engine which is disposed forwardly of the cab and being constructed to accommodate the torque tube 15 and propeller shaft 16 which extend rearwardly and downwardly from the transmission in substantially the longitudinal center of the chassis. Above the side rails the enclosure is formed by two side plate members 17 and 18. Each of these plate members has a horizontal flange at the lower end indicated at 19, which lies on top of the upper flange of the channel 6, as indicated clearly in Figure 3, and is secured to this flange of the channel by means of the bolts 20. The side plates extend upwardly from the supporting flanges 19 and converge inwardly toward their upper ends, being provided at the upper ends with outwardly turned horizontal flanges 22 provided for the purpose of supporting the top plate 23. The top plate 23 extends over the space between the side plates 17 and 18, and lies at a rearwardly inclined angle, the side plates being formed with their upper flanges lying at this same angle. The top plate 23 is provided with a series of louvers 24 which open into the interior of the enclosure for withstanding air from the interior and discharging it rearwardly as indicated by the arrows in Figure 2. Also provided on the top plate is a louver 25 which is of generally semi-cylindrical formation having an angularly directed inlet 26, this inlet having a downwardly curved end 27 for protecting the same against the entrance of water or the like. The inlet 26 opens through the top plate 23 into an annular skirt 28 clamped in any suitable manner about the air cleaner 29 of the vehicle. This air cleaner is provided with the discharge opening 30 leading to the carburetor of the engine.

The back side of the enclosure is provided with a plate 32 which is secured by means of the flange connections 33 to the rear ends of the side plates 17 and 18. The back plate 32 is also provided with a discharge opening or louver 34, as clearly shown in Figure 2. The back plate 32 is cut away, as indicated at 35, from the muffler 14 and extends over beyond the torque tube 15, and then has the downwardly extending lip portion 36 which is slightly offset and receives the upwardly extending rear wall 37 of the bottom plate 38. The upwardly extending edge of the bottom plate 38 is secured to the offset lip 36 by means of bolts 39, as clearly shown in Figures 1 and 2.

The bottom plate 38 is cut out to receive the depending portion of the crankcase of the engine 8, and is provided with the angularly extending side wall 40 extending upwardly to the junction between the channel 6 and the fish plate 7, at which point there is disposed an angularly bent bracket or support 42 by which this side wall 40 of the bottom plate is secured to the fish plate. If a fish plate is not provided, the side plate is furnished with a vertically flanged portion 43, as shown in Figure 2, which may be apertured as indicated at 44 to provide for attachment to the outer surface of the web of the channel. As will be seen in Figure 2, the side plate portion 40 of the bottom member 38 extends forwardly for an appreciable distance to protect the side of the motor block terminating in the portion 45. The end plate 37 of this member terminates laterally at a point adjacent the propeller shaft 16 to provide a substantially triangular area which is open to allow the propeller shaft and torque tube to extend therethrough with sufficient clearance to accommodate vertical movement of the the axle. The bottom plate 38 then extends upwardly at an angle, as indicated at 46, and is joined by means of the bolts 47 to an arcuate plate member 48 which extends over the muffler 14 and thence downwardly beneath the channel 6 to the fish plate 7, being joined thereto by the angle bracket 49 as shown in Figure 1. Preferably, the back plate 32 is joined to the member 48 as by means of the angle bracket 50 adjacent the muffler 14.

The horizontal portion of the bottom plate 38 disposed to the left of the engine 8, as viewed in Figure 1, extends forwardly as indicated by the dotted line 52 in Figure 2 to a point adjacent the bell housing 9, at which point it is provided with the vertical flange 53 which provides a support for the vertically extending front plate 54 shown in Figure 2. This front plate 54 is thereby secured at its lower edge to the forwardly extending portion 52 of the bottom plate, and at its upper edge is provided with a bracket 55 by which it may be supported from a cross frame member extending beneath the cab transversely between the side rails.

Mounted on the side plate members 17 and 18 forwardly of the front end of the top plate member 23 is a transverse plate 56 which, at its rear end, is provided with the V-shaped trough portion 57 adapted to receive the downwardly extending flange 58 terminating the forward edge of the top plate and providing a water-proof connection therebetween. The forward edge of the plate member 56 is turned downwardly, as indicated at 59, into a drain trough 60 secured to the rear wall of the cab, the drain trough 60 being curved to conform to the contour of the cab. This provides for water-proofing the entire top of the enclosure to prevent any possibility of water getting into the engine and its accessories. The plate 56 is secured to the flanges 22 of the side plates by means of the bolts 62.

At its rear edge the top plate 23 is provided with the channel-shaped portion 63 which hooks over the beaded portion 64 of the back plate 32, thereby locking this end of the top plate firmly in position. The forward end of the top plate is latched in position by means of the pivotally mounted latches 61 carried by each of the side plates 17 and 18. Thus, the top plate is firmly secured to the top edges of the side plates to prevent any possibility of leakage therebetween, and also to prevent any rattling or the like. It will be noted that the crankcase of the engine depends below the enclosure, the bottom plate of the enclosure being cut out with a slight amount of clearance to accommodate the depending portion of the crankcase. This facilitates maintaining oil in the crankcase sufficiently cool so that it will not deteriorate in use, while the bottom plate with its diverging sides 40 and 46 laterally encloses the engine against stones or other foreign objects. The end plate 37 carried by the bottom plate 38 is preferably welded or otherwise suitably secured thereto and formed rigid therewith. By connecting this end plate to the back plate 32 by means of the bolts 39 a rigid non-rattling enclosure is provided at the rear end of the engine. The front plate of the enclosure, indicated at 54, is provided with a slotted portion 68 which accommodates the torque tube 15, and is also adapted to be secured to the forward end of the angularly extending portion 46 of the bottom plate.

Thus a substantially box-like rigid enclosure is provided which is so connected together as to prevent any rattling of the respective parts, and is constructed with sufficient clearance relative to the booster engine, the torque tube and the main engine muffler so as to have no contact therewith. In this connection it should be noted that the back plate 32 is provided with the opening 69 which accommodates the projection of the exhaust pipe 70 of the booster engine passing therethrough, and then to a suitable muffler located rearwardly on the chassis.

Figure 5:
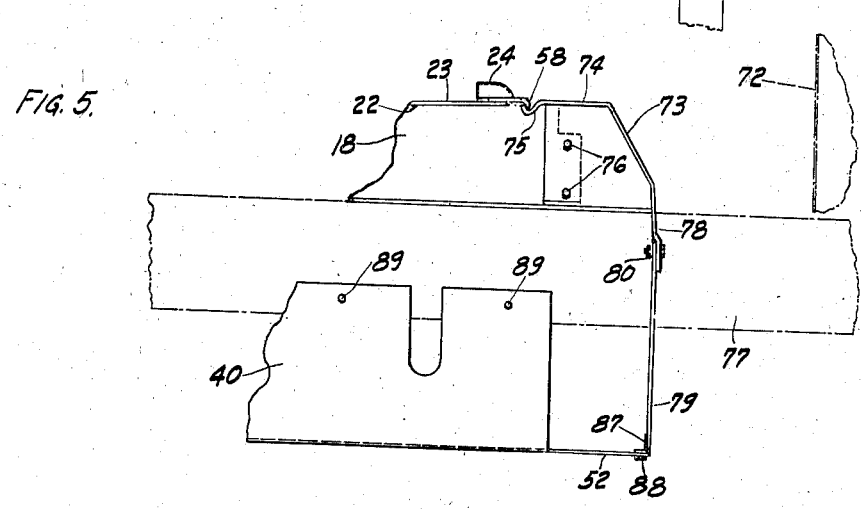
Figure 5 is a partial side elevational view of a modified construction used in connection with a cab-over-engine type truck.
Figure 6:
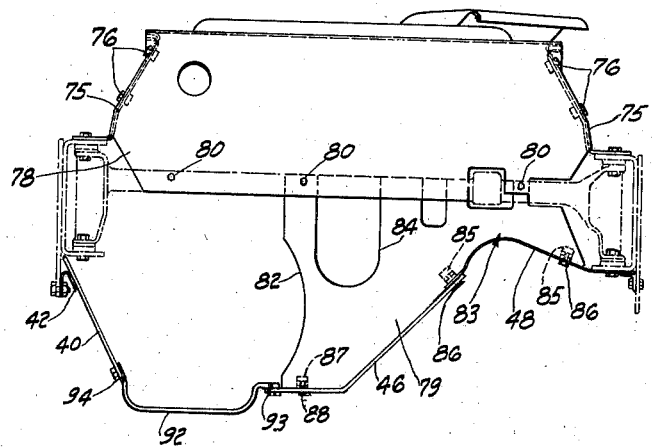
Figure 6 is a front elevational view of the construction shown in Figure 5.
Figure 4:
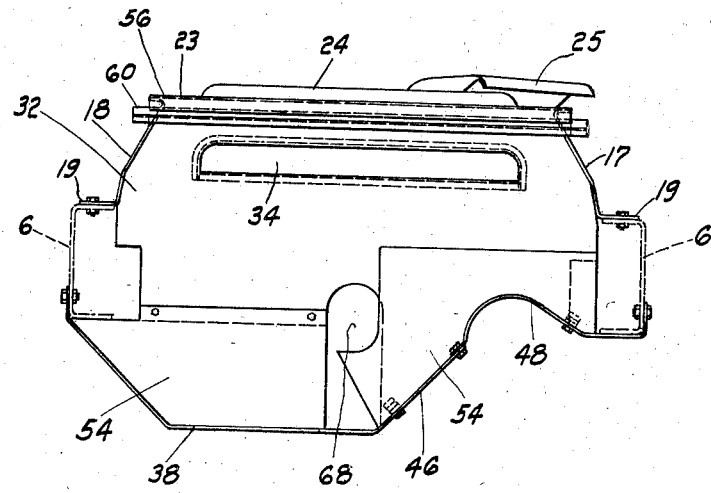
Figure 4 is a front elevational view of the structure shown in Figure 2.

Considering now the embodiment of the invention shown in Figures 5 and 6, this form of enclosure is adapted for use in connection with a truck of the cab-over-engine type in which the rear of the cab, indicated at 72, is disposed an appreciable distance forwardly of the booster engine mounting. This eliminates the possibility of using a drain trough secured to the rear wall of the cab. In this form of the invention the side plates 17 and 18 are formed the same as described in connection with Figures 1 and 2, and are provided at their upper edges with the flanges 22 forming a support for the top plate 23 which is the same as the top plate used in connection with the conventional type of truck. However, in place of the plate 56, this form of the invention provides a front cover plate 73 having the horizontally extending portion 74 projecting rearwardly over the forward ends of the side plates and provided with the transverse depression or groove 75 in which the downwardly turned end 58 of the top plate extends. The cover plate 73 is also provided with lateral side wall portions, as indicated at 75 in Figure 6, which are secured to the forward ends of the side plates 17 and 18, as by means of the securing means 76. The forward portion of the cover plate 73 extends downwardly between the side rails 77 of the truck chassis, and is provided with the depending lip portion 78 which is suitably connected to the front plate 79 of the enclosure by means of the securing means 80. The plate 79 is of the form shown in Figure 6, being cut away as indicated at 82 to accommodate the bell housing of the booster engine, and also being cut away as indicated at 83 to accommodate the muffler of the main engine. The plate 79 is also provided with the U-shaped slot 84 which accommodates the propeller shaft extending rearwardly from the transmission of the vehicle. The back plate of this enclosure is identical with the back plate 32, as shown in Figures 1 and 2, and also the rear plate 37 is formed in the same manner as shown in Figure 1. The forwardly extending portion 48 of the bottom plate 38 is adapted to be connected to the front plate 79 by means of angle brackets 85 and studs 86. The portion 52 of the bottom plate extends forwardly to the front plate 79, and is secured thereto by means of the angle bracket 87 and the studs 88, thereby locking the front plate firmly in position. It will be noted that the side plate portion 40 of the bottom plate extends forwardly for an appreciable distance in this form of the invention, as shown clearly in Figure 5, being secured to the channel by means of the studs 89, no fish plates being employed in connection with the cab-over-engine type construction.

The forwardly extending portion 52 of the bottom plate 38 extends along the side of the engine block 8 adjacent the propeller shaft, and at its forward end has connection to the front plate 79 by means of the angle bracket 87 and studs 88 as previously described. The remaining portions of the enclosure are formed in the same manner as described in connection with Figures 1 to 3, and are not believed to require any further description. It might be pointed out that in connection with the cab-over-engine enclosure, a cross member 92 which is preferably formed of rigid material extends beneath the engine block 8 rearwardly of the bell housing, and forms a rigid connection between the side plate portions 40 of the bottom plate and the portion 52 thereof which extends forwardly along the side of the engine. This member 92 is suitably secured to these portions through the studs 93 and 94, thereby rigidly tieing them together to prevent any possibility of rattling thereof.

It is therefore believed apparent that I have provided a novel type of enclosure which, with slight modification, is suitable for either a conventional type of truck or a cab-over-engine type and which will fully protect the booster engine against weather or the possibility of being damaged by flying stones or other foreign materials. In addition, the enclosure is so designed as to insure adequate ventilation of the engine while at the same time retaining sufficient heat to facilitate starting of the engine in cold weather. The provision of the louver for the air cleaner leading to the carburetor is of distinct importance inasmuch as the particular arrangement shown is so designed as to receive the air currents coming from the side of the cab above the running-board which swirl inwardly toward the back of the cab in a line generally indicated by the arrows shown in Figure 3. With such a construction, the opening 26 is so arranged as to receive the full benefit of these air currents, thereby insuring a positive supply of air under pressure to the carburetor and preventing any possibility of a rarified air mixture due to the partial vacuum created rearwardly of the cab.

Other advantages of the invention include the designing of the enclosure so that it may be made from simple metal stampings or from thin gauge sheet metal, and yet when assembled, will be sufficiently rigid to prevent any rattling or vibration due to the interlocking of the various component parts in the manner specified.

I am aware that various changes may be made in certain details of the present construction, and I therefore do not intend to be limited except as defined by the scope and spirit of the appended claims.

I claim:

1. In a truck having an auxiliary engine mounted rearwardly of the driver's cab and adjacent one side frame member, an enclosure for said engine comprising a front plate, a rear plate, a bottom plate rigidly joined thereto and having diverging side wall portions extending to the side frames, and a detachable top plate having means for collecting air from the side of the cab and discharging it into the carburetor of the engine.

2. In a truck having an auxiliary engine mounted rearwardly of the driver's cab and adjacent one side frame member, an enclosure for said engine comprising a front plate, a rear plate, a bottom plate rigidly joined thereto and having diverging side wall portions extending to the side frames, a detachable top plate, means forming a rain discharge trough on the rear of said cab, and plate means spanning the space between said top plate and said trough.

3. In a truck having an auxiliary engine mounted rearwardly of the driver's cab adjacent one side frame member, an enclosure for said engine comprising side plates secured on the side frame members and extending upwardly and inwardly, a bottom plate along the sides of the crankcase of said engine having upwardly and outwardly directed side flanges secured to said frame members, said bottom plate also having a back plate extending vertically between said side frame members, a detachable cover plate supported on the upper edges of said side plates, louvres formed in said top plate, and an angularly directed fresh air intake carried by and extending above said top plate.

4. The enclosure of claim 3 wherein said intake has a circular skirt portion in the plane of said top plate receiving a circular air cleaner for the carburetor of said engine.

5. An enclosure for an auxiliary engine located rearwardly of the driver's cab on a truck, including side closure means having flanged horizontal upper edges, a top plate adapted to be detachably supported thereon having rearwardly opening louvres formed therein, and an intake opening in said top plate having a forwardly and outwardly directed shroud for catching air sweeping around the side of said cab during forward motion of the truck.

6. The enclosure of claim 5 further characterized in the provision of a rain trough around the back of said cab, and an extension of said enclosure forwardly of said top plate dipping into said trough.

7. In combination, in a truck having side frame members and a driver's cab, an auxiliary engine mounted rearwardly of said cab adjacent the inner side of one of said side frame members and having a crankcase depending below said frame member, an enclosure for said engine including a bottom plate extending along the sides of the crankcase and having upwardly turned side flanges secured to the lower portions of side frames, one of said side flanges being arched up over the truck propeller shaft, side plates above said side frame members, and a detachable top plate supported on said side plates.

8. The combination, with a truck having a driver's cab, a chassis supporting said cab, and an engine mounted in said chassis rearwardly of said cab, said engine having a carburetor provided with an air intake, of a top plate extending over said engine rearwardly of said cab and having a forwardly and laterally directed louvre opening toward one side of said cab for receiving air from said side of said cab and directing it into said intake.

9. The combination of claim 8 further characterized in the provision of rearwardly directed louvres in said plate providing for escape of heated air from beneath said plate.

10. In a truck having a chassis including parallel side rails, a driver's cab supported thereon and extending an appreciable distance thereabove, an engine mounted between said rails rearwardly of said cab, an enclosure for said engine including a top plate extending thereover, and means in said top plate forming a forwardly and laterally extending scoop for receiving air slipping by the side of said cab during forward movement of said truck and delivering it into said enclosure.

11. In a truck having a chassis including parallel side rails, a driver's cab supported thereon and extending an appreciable distance thereabove, an engine mounted between said rails rearwardly of said cab, an enclosure for said engine including a top plate extending thereover, and means in said top plate forming a plurality of spaced rearwardly opening louvres for exhausting heated air from within said enclosure during forward movement of said truck.

DONALD D. ORMSBY.